United States Patent Office 3,247,890
Patented Apr. 26, 1966

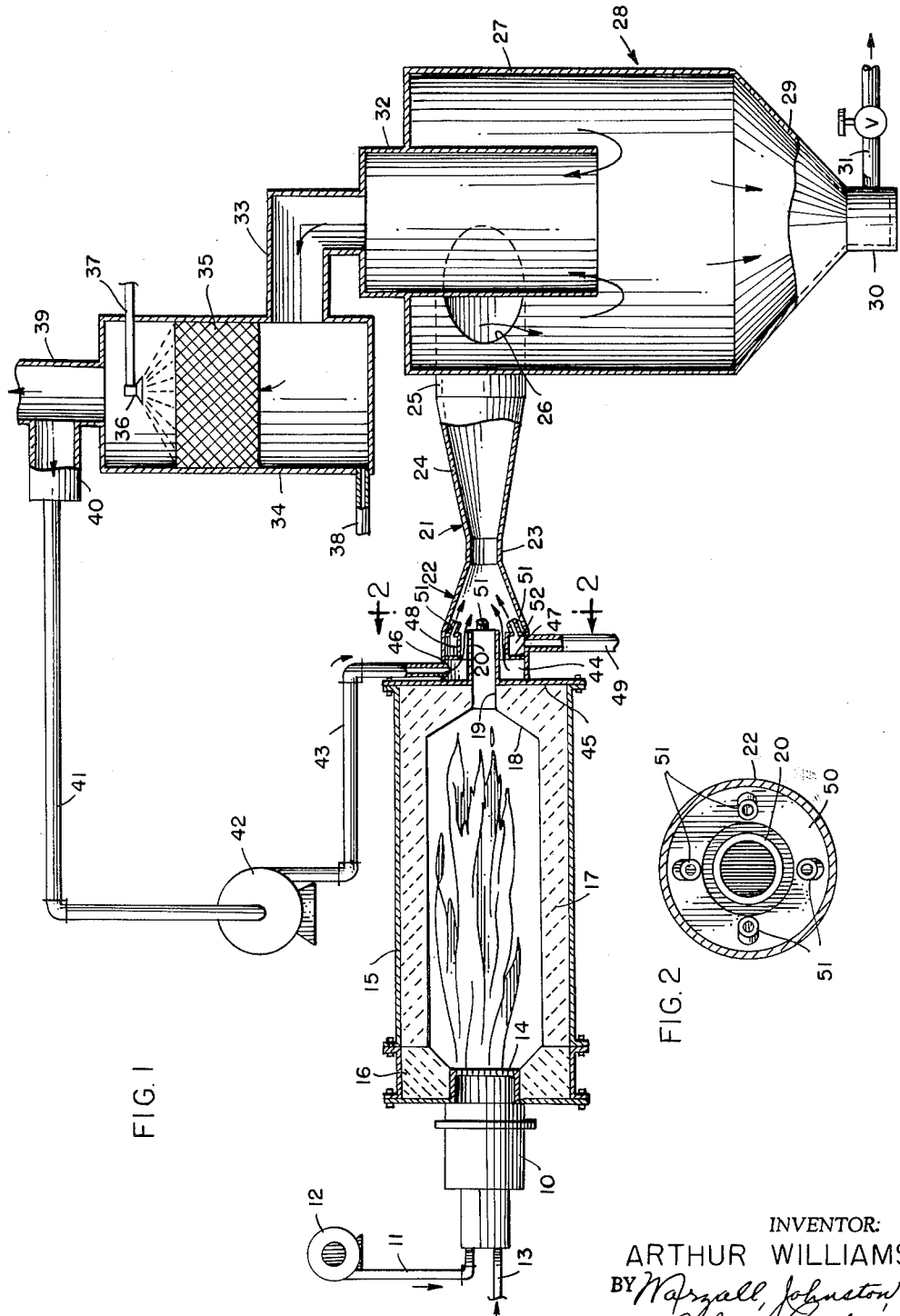

3,247,890
EVAPORATION OF HEAT SENSITIVE
MATERIALS
Arthur Williams, Munster, Ind., assignor, by mesne assignments, to Selas Corporation of America, a corporation of Pennsylvania
Filed June 30, 1964, Ser. No. 379,230
8 Claims. (Cl. 159—47)

This invention relates to the evaporation of heat sensitive materials and more particularly to process and apparatus for evaporating such materials. The invention is especially concerned with a new and improved process and apparatus for concentrating heat sensitive food products.

Most of the heat sensitive food products are presently concentrated in calandria, rising-film, or forced-circulation evaporators. The calandria type of evaporator is a vertical short tube evaporator with a central downtake and is widely used in the sugar industry. The rising-film evaporator has long vertical tubes with natural circulation and is widely used in the food industry for the concentration of clear solutions of low to moderate viscosity, such as milk, fruit juices, sugar solutions and protein extracts. The forced-circulation type of evaporator has a two-pass submerged horizontal heating element and an external liquid-vapor separator. The flow through the horizontal tubes is introduced through a centrifugal pump, and there is no boiling in the heating element section. This evaporator is well suited for materials with solids in suspension or where extreme fouling conditions exist. It is widely used in the tomato industry because of the suspended solids in tomato juice.

These evaporators all involve recirculation and exposure of the heat sensitive material to heating surfaces over a substantial period of time. In some cases it is necessary to effect the evaporation at relatively low temperatures, but this increases the amount of time required. Higher temperatures can be used if the retention time is drastically reduced and recirculation is eliminated.

In accordance with the invention, a liquid containing a heat sensitive substance is evaporated by introducing it into a stream of hot combustion gases concurrently with recirculated cooler combustion gases and thereafter passing the intimate mixture of gases and liquid into a separating zone.

Briefly, the apparatus for the practice of the invention comprises a refractory lined combustion zone having an inlet at one end and an outlet at an opposing end, the outlet in said combustion zone being joined with a tubular member which projects outwardly from said combustion zone, said tubular member being surrounded by an annular chamber having an annular opening therein adjacent the outer wall of said tubular member, means for introducing recirculated combustion gases to said annular chamber so that they can pass axially adjacent the outer wall of said tubular member, a second annular chamber around said tubular member, slanted outlets in said second annular chamber, the center lines of which converge in the path of hot gases passing out of said tubular member, means to introduce a liquid to be evaporated into said second annular chamber, thereby causing converging streams of said liquid to be mixed concurrently with said heated gases and said recirculated gases, and separating means where vaporizable liquids and incondensible gases of the resultant intimate mixture are separated from the residual concentrate.

Briefly, the process of the invention comprises feeding a central stream of hot combustion gases into an upstream part of a mixing zone converging toward a narrow throat in the downstream direction, simultaneously feeding into said mixing zone cooler gases in the form of an annular, concurrent stream about said central stream, of which cooler gases cooled, recycled combustion gases are an example, and simultaneously feeding a liquid composition to be concentrated into said mixing zone in the form of streams emanating outside said streams of gases and directed angularly thereinto in said downstream direction. The liquid streams preferably converge toward a common point in the vicinity of the throat.

One object of the present invention is to provide new and improved process and apparatus for concentrating solutions or suspensions of heat sensitive materials in which recirculation of such materials is unnecessary and the retention time is greatly reduced. A further object of the invention is to provide a new and improved process for the evaporation of water from food products containing water.

Another objective of the invention is to provide improvements in both process and apparatus for concentrating temperature-sensitive liquid compositions. Another object is to provide processes utilizing a cooler gas stream in surrounding relationship to a concurrent, central, hot combustion gas stream to ameliorate the adverse effects of the hot gas stream on temperature-sensitive liquid compositions fed into said streams in direct heat exchange therewith. A further object is to provide concentrating apparatus utilizing direct heat exchange between hot combustion gases and temperature-sensitive liquid compositions. Still another object is to provide apparatus for direct heat exchange between hot combustion gases and temperature-sensitive liquid compositions, said apparatus utilizing a heat exchange zone tapering to a narrow throat, tubular means for directing a central stream of hot combustion gases, means for supplying an annular stream of cooler gases about said central stream, and means for directing streams of said liquid compositions angularly into said gas streams in the vicinity of said throat.

The foregoing and numerous other important objects, advantanges, and inherent functions of the invention will become apparent as the same is more fully understood from the following description, which, taken in connection with the accompanying drawings, discloses a preferred embodiment of the invention.

In the drawing:

FIG. 1 is a side elevation, partly in section, of a preferred embodiment of apparatus of the invention.

FIG. 2 is a section taken on section plane 2—2 of FIG. 1.

Referring to the drawings, the apparatus comprises a burner 10 adapted to burn a combustible gas, such as natural gas and oxygen, e.g., air. The air is supplied to the burner through pipe 11 connected to blower fan 12. The combustible gas is supplied to the burner through pipe 13. The gases ignite at burner plate 14, emitting hot combustion gases into the cylindrical combustion chamber 15.

Chamber 15 has a ring-shaped refractory lining 16 at its upstream end around the area of the burner plate 14. Another refractory liner 37 lines the cylindrical wall of the combustion chamber 15. The downstream end of the refractory liner 17 has a frusto-conical wall 18, by which the combustion chamber defined by the liners 16 and 17 tapers to a small discharge or exit opening 19 centrally positioned in the downstream portion of the combustion chamber 15.

The hot combustion gases discharged through opening 19 pass into a hollow, cylindrical discharge tube 20 coaxial with the opening 19. The hot combustion gases are discharged as a central stream into the direct heat exchanger 21. The heat exchanger 21 comprises a frusto-conical tubular part 22 tapering in the downstream direction of gas flow to a relatively narrow throat 23. The exchanger then flares outwardly in the downstream direction in the zone defined by the frusto-conical, tubular part 24.

The downstream end of the part 24 is connected to a tube 25 which opens tangentially at opening 26 in the upper part of the cylindrical side wall 27 of the cyclone separator 28. Liquids and solids are separated from gases and vapors in the separator 28, the former dropping into the conical bottom 29 and collection chamber 30, from which they are drawn out through the pipe 31 having a valve therein.

The gases and vapors pass upwardly into the centrally positioned, hollow cylinder 32 opening downwardly in the mid-portion of the cyclone separator. These gases and vapors flow through the pipe 33 into a cooling vessel 34. The cooling vessel 34 has a layer of packing 35 such as gravel, packing rings, or the like, through which the gases pass upwardly. The upper part of the packing 35 is sprayed with a cooling liquid, e.g., water, sprayed from the spray nozzle 36 connected by pipe 37 to a source of water. The gases are cooled substantially in their passage through the packing 35. The water which passes through the packing 35 is drawn out of the cooling vessel 34 via the pipe 38.

The cool gases pass into the stack 39, which has a branch or tap off 40. A portion of the gases are drawn from the tap off 40 and through the pipe 41 by the fan 42. This portion of the cooled gases is forced by the fan 42 through pipe 43 into an annular chamber 44 surrounding the tube 20. The annular chamber 44 communicates with the heat exchanger 21 by the annular space between the cylindrical wall 48 and the cylindrical tube 20, whereby the cooled gases forced into the chamber 44 flow in the form of a surrounding, annular stream about the hot combustion gas stream into the heat exchanger 21.

The tubular wall 46 of the upstream end of the heat exchanger has mounted thereon a disc-shaped wall 47 which, together with the cylindrical wall 48 and a second, disc-shaped wall 50 defines a ring-shaped manifold 52 having a plurality of nozzle members 51 extending angularly inwardly from the wall 50. Heat-sensitive liquids to be concentrated are supplied via pipe 49 to the manifold 52, from which these liquids are sprayed into the gas streams in the form of streams converging adjacent the area of throat 23.

As an illustrative example, tomato juice is concentrated in the apparatus of FIG. 1. Air and natural gas are burned at a volume ratio of about 10:1, respectively, in combustion chamber 15. The temperature of the combustion gases in tube 20 is about 1410° F. The temperature of the gas and liquid stream at opening 26 of separator 27 is about 170° F. by virtue of the vaporization of some of the water of the tomato juice fed through tubes 51 to the heat exchange zone 21 and the introduction as an annular stream of recycle gases at about 150° F. via chamber 44.

The recycle gases, after separation from the liquid and solid components in separator 27, are cooled by water sprayed at about 70° F. onto packing 35. The recycle gas at tap-off 40 has an incondensible gas to water vapor volume ratio of about 20:1.5.

The process and apparatus are especially useful in evaporating heat sensitive liquids, such as, tomato juice, orange juice, pineapple juice, grape juice, apple juice, milk, corn syrup, and other liquids containing sugars or other carbohydrates or proteins which are sensitive to heat.

It is though that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A process for concentrating temperature sensitive liquids by direct heat exchange with combustion gases, which comprises feeding a central stream of hot combustion gases into an upstream part of a mixing zone converging toward a narrow throat in the downstream direction, simultaneously feeding into said mixing zone cooler gases in the form of an annular, concurrent stream about said central stream, and simultaneously feeding a liquid composition to be concentrated into said mixing zone in the form of streams emanating outside said streams of gases and directed angularly thereinto in said downstream direction.

2. A process as claimed in claim 1 wherein said cooler gas are combustion gases which have been discharged from said heat exchange zone, cooled, and recycled to said zone.

3. A process as claimed in claim 2 wherein said gases, liquid composition, and vaporized liquid, flow from said throat into a downstream portion of said mixing zone flaring in the downstream direction, and thereafter the incondensible gases and vapors of the resultant mixture are separated from the concentrated, liquid portion of said liquid composition.

4. Apparatus adapted for concentration of heat sensitive liquids comprising a combustion chamber, a direct heat exchange member at the downstream end of said combustion chamber, said combustion chamber having a combustion gas discharge opening at the downstream end thereof, a tube at the upstream end of said member and in communication with said opening for flow of combustion gases from said combustion chamber into said member, means defining with the outer side of said tube an annular gas flow passage with an annular opening about the downstream end of said tube, and means in said member for directing a plurality of streams of a liquid into the gases supplied to said member through said tube and said annular opening.

5. Apparatus as claimed in claim 4 wherein said last-mentioned means comprises an annular manifold about said annular gas flow passage, and nozzles on said manifold directed downstream and radially inwardly.

6. Apparatus as claimed in claim 5 wherein the upstream part of said member tapers to a narrow throat and the downstream part of said member flares from said throat.

7. Apparatus as claimed in claim 4, means communicating with the downstream end of said member for separating the nongaseous and gaseous components of the resultant stream discharged from said member, means for cooling the separated gaseous components, and means for recycling cooled, gaseous components to said annular gas flow passage.

8. Apparatus adapted for concentration of heat sensitive liquids comprising a refractory lined combustion zone having an inlet at one end and an outlet at an opposing end, the outlet in said combustion zone being joined with a tubular member which projects outwardly from said combustion zone, said tubular member being surrounded by an annular chamber having an annular opening therein adjacent the outer wall of said tubular member, means for introducing recirculated combustion gases to said annular chamber so that they can pass axially adjacent the outer wall of said tubular member, a second annular chamber around said first-mentioned annular chamber, slanted outlets in said second annular chamber, the center lines of which converge in the path of hot gases passing out of said tubular member, means to introduce a liquid to be evaporated into said second annular chamber, thereby causing converging streams of said liquid to be mixed concurrently with said heated gases and said recirculated gases, and separating means where vaporizable liquids and incondensible gases of the resultant intimate mixture are separated from the residual concentrate.

No references cited.

NORMAN YUDKOFF, *Primary Examiner.*